(12) United States Patent
Stubbe (10) Patent No.: US 10,189,375 B2
(45) Date of Patent: Jan. 29, 2019

(54) FITTING FOR FIXING AN OBJECT ON A RAIL

(71) Applicant: ALLSAFE JUNGFALK GMBH & CO. KG, Engen (DE)

(72) Inventor: Ingolf Stubbe, Gottmadingen (DE)

(73) Assignee: Allsafe Jungfalk GmbH & Co. KG, Engen (DE)

( * ) Notice: Subject to any disclaimer, the term of this patent is extended or adjusted under 35 U.S.C. 154(b) by 0 days.

(21) Appl. No.: 14/909,815

(22) PCT Filed: Aug. 7, 2014

(86) PCT No.: PCT/EP2014/002170
§ 371 (c)(1),
(2) Date: Feb. 3, 2016

(87) PCT Pub. No.: WO2015/018526
PCT Pub. Date: Feb. 12, 2015

(65) Prior Publication Data
US 2016/0194085 A1    Jul. 7, 2016

(30) Foreign Application Priority Data
Aug. 7, 2013 (DE) .................. 10 2013 108 540

(51) Int. Cl.
*B60N 2/015* (2006.01)
*B64D 11/06* (2006.01)
*F16M 13/02* (2006.01)

(52) U.S. Cl.
CPC ..... *B60N 2/01516* (2013.01); *B60N 2/01558* (2013.01); *B60N 2/01575* (2013.01); *B64D 11/0648* (2014.12); *B64D 11/0696* (2013.01); *F16M 13/02* (2013.01)

(58) Field of Classification Search
CPC ........... B60N 2/01558; B60N 2/01516; B60N 2/01575; B64D 11/0696; B64D 11/0648
See application file for complete search history.

(56) References Cited

U.S. PATENT DOCUMENTS

| 3,570,415 | A |   | 3/1971  | Drinnon et al. |
|-----------|---|---|---------|----------------|
| 3,677,195 | A |   | 7/1972  | Prete, Jr.     |
| 3,800,713 | A | * | 4/1974  | Nordstrom ................ B60P 7/13 410/79 |
| 4,062,298 | A |   | 12/1977 | Weik           |
| 4,277,043 | A |   | 7/1981  | Weik           |
| 4,493,470 | A |   | 1/1985  | Engel          |
| 4,776,533 | A | * | 10/1988 | Sheek ................ B64D 11/0696 244/118.6 |

(Continued)

FOREIGN PATENT DOCUMENTS

| DE | 20218780 U1 | 2/2003 |
| EP | 1794053 A1  | 6/2007 |

(Continued)

OTHER PUBLICATIONS

International Search Report for PCT/EP2014/002170 dated Nov. 14, 2014.

*Primary Examiner* — Eret C McNichols
(74) *Attorney, Agent, or Firm* — Bachman & LaPointe, PC (57) ABSTRACT

A fitting for fixing an object on a rail, the fitting having a retainer (2) in a sliding body and having a holding and locking element (8.1) arranged so as to be movable relative to the retainer.

14 Claims, 8 Drawing Sheets

(56) References Cited

U.S. PATENT DOCUMENTS

| | | | |
|---|---|---|---|
| 4,796,837 A | 1/1989 | Dowd | |
| 5,083,726 A * | 1/1992 | Schurr | B64D 11/0696 244/118.6 |
| 5,762,296 A * | 6/1998 | Gilbert | B64D 11/0696 244/118.1 |
| 5,871,318 A | 2/1999 | Dixon et al. | |
| 7,232,096 B1 * | 6/2007 | Ahad | B64D 11/0696 244/118.6 |
| 9,022,708 B2 * | 5/2015 | Frey | B64D 11/0696 244/118.5 |
| 9,284,056 B2 * | 3/2016 | Mejuhas | B64D 11/0696 |
| 9,789,966 B2 * | 10/2017 | De Morais | B64D 11/0696 |
| 2008/0191115 A1 * | 8/2008 | Stubbe | B64D 11/0696 248/503.1 |
| 2009/0026827 A1 * | 1/2009 | Bishop | B60P 7/0815 297/463.1 |
| 2011/0198464 A1 * | 8/2011 | Hoge | B60N 2/01575 248/223.41 |
| 2015/0285283 A1 * | 10/2015 | Danet | B64D 11/0696 403/322.4 |
| 2016/0107542 A1 * | 4/2016 | Trimble | B64D 11/0696 296/65.03 |
| 2016/0251082 A1 * | 9/2016 | Shih | B64D 11/0696 248/636 |

FOREIGN PATENT DOCUMENTS

| | | | |
|---|---|---|---|
| WO | 2006034855 A1 | 4/2006 | |
| WO | WO-2006034855 A1 * | 4/2006 | ......... B64D 11/0696 |

* cited by examiner

Fig 4

FITTING FOR FIXING AN OBJECT ON A RAIL

BACKGROUND OF THE INVENTION

The present invention concerns a fitting for fixing an object on a rail.

The device according to the invention serves primarily for the fixing of aircraft seats on corresponding rails in an airplane, but it should not be limited to this, when described hereafter with the aid of this example.

It is known that airplane seats very often need to be shifted depending on the occupancy of the airplane, and this needs to be done as quickly as possible. The subsequent fixing in a desired position must in turn be done very reliably, since the seats need to comply with a definite mandatory speed of acceleration and deceleration.

Most such airplanes are outfitted today with so-called airline rails, which are generally familiar. For a more detailed illustration of an airline rail, refer to DE 202 18 780 U1. The airline rail has an undercut groove to receive a sliding body, while corresponding troughs are formed in the free margins of the groove on both sides.

Fittings are known for the fixing of seats on such airline rails, possessing the aforementioned sliding body, which slides by lateral sliding shoes in the undercut groove and can be displaced in this groove. In order to fix this sliding body, which also has a connection element, in a defined location of the airline rail, a retainer sits on top of the sliding body. This retainer has laterally molded thickenings between every two sliding shoes. If the retainer is lowered, these thickenings travel into the above mentioned troughs of the airline rail, so that now a further shifting of the fitting is no longer possible.

A screw is used for the lowering and fixing of the retainer, whose head presses against the retainer and thereby lowers the retainer downward. The drawback with this is that a very long screw path needs to be traveled, and this both during the lowering and the raising of the retainer. This takes an exceptional amount of time, it is tedious, and it often has the result that the fittings are not properly fixed on the airline rail, so that there might occur a clattering or even a loosening of the fitting. This is extremely undesirable. Such a device in which a screw is used for the lowering and fixing of a retainer is described in U.S. Pat. No. 4,796,837.

In U.S. Pat. No. 4,493,470 another device is disclosed for fixing an object on a rail by means of a fitting which can move with a sliding body along the rails of a groove and which has a retainer, which can be lowered into at least one side groove trough in the rail. The retainer is joined by a cylindrical connection element to the sliding body and is braced against the sliding body and/or against a handling element via a compression spring. For the moving or fixing of the device, only the handling element needs to be activated. The drawback with this device is that here as well a clattering or a loosening of the fitting is not entirely precluded.

Another device for the fixing of an object on a rail by means of a fitting is described in U.S. Pat. No. 5,871,318. In this case, a locking pin is used for the lowering and fixing of a retainer, which is rotated to secure the retainer in at least two height positions relative to the rail. The drawback to this device is that it has a complicated makeup with many components. Furthermore, a proper and secure fixing of the device on the rail is not guaranteed.

Moreover, a device is known from EP 1 794 053 which overcomes many of the aforementioned drawbacks. Sliding body and retainer are connected here by means of a connection element, at whose end facing away from the rail there is a rotary element. The rotary element is designed so that it makes possible the fixation of the retainer, which can be displaced relative to the sliding body, in various positions. A detent trough or detent notch coordinated with the rotary element ensures a noiseless and secure fixation of the retainer in the rail. Furthermore, the rotary element also serves for the fixation of the retainer in the starting position, i.e., when this is not fixed in the rail, but instead can be removed from it or has not even been introduced in it. The elegant design of the rotary element as a bifunctional detention thus enables the sliding shoe to be introduced into the rail, a subsequent movement of the fitting within the rail, and a fixing of the fitting merely by turning the rotary element. Such a turning of the rotary element produces a releasing of the spring-loaded retainer, which then travels into the rail and is fixed there.

The connection element moreover has a threaded segment, by which it is secured in a corresponding threaded borehole of the sliding body. As a rule, for the noiseless and clatter-free fixation of the fitting in the rail the connection element is screwed for a bit into the sliding body, after the retainer has been lowered into the rail. Thus, the rotary element engages on the retainer by its coordinated detent trough, so that once again the fitting as a whole is secured clatter-free in the rail. A screwing of the connection element into the sliding body is done here with a suitable tool. Advisedly, a tool purchase is provided at one end of the connection element, accessible to the user.

The object of the present invention is to improve a device of the above kind and to make possible an easier detention or fixation of the retainer in different positions. The device should furthermore prevent an unintentional and undesirable loosening or even releasing of the fitting from the rail when it has already been fixed in the rail.

SUMMARY OF THE INVENTION

The foregoing object of the present invention is achieved according to the invention wherein the fitting for fixing an object in a rail comprises a sliding body and a retainer, wherein the retainer is coordinated with the sliding body in a movable, preferably a displaceable manner.

Preferably, the retainer sits like a saddle on the sliding body. Preferably sliding body and retainer are connected by a connection element. For example, a bolt with threaded segment inserted into a threaded borehole of the sliding body or a screw can be considered for this. The connection element is introduced or screwed into the sliding body from above, that is, from a side of the fitting facing away from the rail in the position of use. Sliding body and retainer are connected in that the connection element is inserted through a recess running through the retainer into the sliding body. Preferably the recess is dimensioned so that retainer and connection element are movable with the least possible free play relative to each other.

Thus, the retainer sitting like a saddle on the sliding body can move preferably in one direction, which essentially runs orthogonally to an imaginary longitudinal direction of the rail.

The connection element has a head at its end not introduced into the sliding body. This serves as an abutment for a force storing element, preferably a spiral spring, which engages at the other end with the retainer. The retainer is thus subjected to force and biased in a direction running essentially radially to the imaginary longitudinal axis of the rail.

The retainer can be placed in a lowered and a raised position, whereby in the lowered position it is at least partly introduced into the rail, and in the raised position it is outside of the rail.

In the context of the present invention, we have in mind a familiar airline rail with an undercut groove on both sides. Troughlike recesses formed at regular intervals in the groove edges correspond to specially designed devices of the sliding body and the retainer. Preferably, thickenings are formed on the retainer, which engage by form fitting in the recesses of the groove edges and thus secure the fitting in the rail. Moreover, sliding shoes are preferably molded on the sliding body. These are dimensioned so that they allow the fitting to be inserted into the rail with the least possible free play.

Furthermore, the sliding shoes prevent the fitting being taken out of the rail when the sliding shoes or an upper active surface of the sliding shoes is situated inside the rail and underneath the undercut regions between the recesses of the groove. The fitting is dimensioned such that a fixation by introducing the retainer into the rail is only possible in the above described configuration. In a position of use to be described more closely below, there is also a lower active surface of the retainer, lying partly against the rail from above, at a side of the undercuts of the groove opposite the upper edge of the sliding shoes. Thus, the fitting is fixed in the rail by the upper active surface of the sliding shoe, lying on the inside against the undercut of the groove, and the lower active surface of the retainer, lying from the outside against the undercut of the groove.

However, the invention should not be confined to a fitting to be used with an airline rail. Instead, the fixation mechanism in particular according to the invention can also be applied to other kinds of rails, such as perforated rails, in which the retainer can be at least partly inserted.

In the lowered position the retainer serves preferably for fixing the fitting in the rail, while the retainer in the raised position allows an installing and removal of the fitting from the rail, a shifting of the fitting along the rail to the desired position and a storing of the fitting ready to use outside the rail. Thus, the lowered and raised position corresponds to a position of use and a starting position of the fitting, respectively. The position of use and starting position can each correspond to an end position of the fitting or the retainer, but in the context of this invention the starting position and the position of use will also encompass configurations which do not correspond to an end position.

According to the invention, the fitting comprises a holding and locking element, which is arranged to be movable relative to the retainer. The holding and locking element serves preferably for a fixing of a position of the retainer relative to the sliding body. Thus, one can determine via the holding and locking element whether the retainer and thus at the same time also the fitting itself is in the starting position or the position of use.

In order to fix the retainer in a particular position relative to the sliding body, preferably in the starting position or the position of use, one can envision various mechanisms of fixation. Preferably, the holding and locking element is subjected to a force for this. In this way, it is preferably biased, and a spiral spring preferably serves for the biasing. However, other force storing elements which can generate such a biasing should also be encompassed by the present invention. For example, one can think of torsion springs or also pneumatic springs and the like.

Moreover, it has preferably a device for fixation, which can for example enter into a form fitting or non-positive operative connection with a corresponding abutment, especially a structure of the retainer fashioned as an abutment.

According to a first sample embodiment, the holding and locking element is essentially an arched rectangle with a recess, whose function shall be described below. In this sample embodiment, it is guided in a seat. The seat here serves for guidance and limiting of possible movements of the holding and locking element. Preferably, therefore, the holding and locking element is guided in the seat with the least possible free play.

The seat is preferably molded on the sliding body or coordinated with it. On the one hand, one can envision here a single-piece configuration of sliding body and seat. Especially preferably, however, sliding body and seat are fashioned as separate pieces. Thus, a replacement of the seat in itself or the spring located therein or the holding and locking element is easily possible. Moreover, the seat is preferably mounted on the sliding body in that two grooves of the seat are shoved into corresponding bearing elements of the sliding body. Furthermore, it has a recess, by means of which it is connected in the same way as the retainer to the sliding body.

In order to fix the retainer in the starting position, i.e., in a position not lowered into the rail, the fixation device on the holding and locking element preferably interacts with the abutment on the retainer in the form of a detent element. Generally, one can envision here a form fitting or a non-positive operative connection, and preferably both operative connections are realized. In the first sample embodiment, the force-loaded holding and locking element has a fixation device which can enter into an operative connection by form fitting with the complementary abutment of the retainer.

Preferably the fixation device is coordinated with the retainer or formed on it so that it can be displaced by motion guided in the seat toward the retainer and then enter into form fitting operative connection with the abutment of the retainer.

Preferably, the fixation device is an edge of the holding and locking element, which can enter into form fitting operative connection with the abutment, which is configured as a complementary shaped trough of the retainer. Of course, in place of the combination of edge and trough one can conceive of a combination of other fixation devices and abutments which can be brought into form fitting. Many structures or configurations can be considered for this, such as a bolt and a corresponding recess or an operative connection couple of tongue and groove or two undercut and interlocking edges.

The biasing force acting on the holding and locking element preferably has the effect that the holding and locking element is moved in the direction of the retainer.

Although a form fitting connection formed from corresponding fixation device and abutment is generally suitable and sufficient to fix the retainer and thus the fitting in the starting position, this fixation is preferably supported at the same time by a non-positive operative connection between fixation device and abutment in addition to the form fitting. Since the holding and locking element is force-loaded, the form fitting according to the first sample embodiment always works at the same time when fixing the position of the retainer by the holding and locking element, being generated by the biasing force acting on the holding and locking element in the direction of the retainer.

However, it should be mentioned in this place that the holding and locking element, even without being subjected to a force, can fix the retainer in the starting position, since the form fitting operative connection is sufficient for this. One can then conceive of a clamping device, for example, which replaces the biasing force acting on the retainer.

For the fixing of the retainer in the position of use, i.e., in a position at least partly introduced into the rail, the holding and locking element interacts with the retainer as a locking element. Preferably, the retainer is movable in a direction running essentially orthogonal to the imaginary longitudinal axis of the rail. In order to fix the retainer and thus the fitting in the position of use, the holding and locking element is displaced relative to the retainer so that it at least partly reaches around or across a segment of the retainer lying essentially opposite to the rail. This segment is an end face, in particular. In this way, the holding and locking element prevents an unintentional movement of the retainer out from the position of use.

On the other hand, in the position of use a segment of the holding and locking element situated near the fixation device comes to lie against the segment or the end face of the retainer. The biasing force acting on the holding and locking element is herewith transferred to the retainer. The biasing force of the holding and locking element transferred to the retainer acts in the same direction as the biasing acting on the retainer from the spring bearing against the head of the connection element.

In order to transfer the fitting from the starting position to the position of use, a user can move the holding and locking element a bit away from the retainer against the biasing force inside the seat. For this, at least one activating device is formed on the holding and locking element. Preferably, however, two activating devices are formed on the holding and locking element in the form of two bolts or boltlike cross bars. This configuration is especially advantageous, since the boltlike cross bars are each led in a recess of the seat provided for this purpose, especially an oblong hole. Thus, the holding and locking element is further stabilized or guided in stable manner by the mounting of the boltlike cross bars in the provided recesses or oblong holes of the seat.

Moreover, the present invention according to a first sample embodiment preferably has a position indicator. This serves to indicate the position of the fitting, at least signalling whether the retainer and thus the fitting is located in the starting position or the position of use. The position indicator has a two-part design and consists of a recess of the seat and at least one segment of the holding and locking element. The at least one segment of the holding and locking element is marked in color, while one can conceive of at least a colored marking, but also a use of several colors, such as red and green. Now, if the fitting is in the starting position and thus the holding and locking element does not reach across the retainer, then for example the user can see the green segment through the recess of the seat, for example. In the position of use, the red segment of the holding and locking element can be seen through the recess of the seat. Thus, the position indicator assures a certain indication of the position of the fitting.

Many benefits result from the configuration of the first sample embodiment of the fitting according to the invention.

On the one hand, an unintentional releasing of the fitting from its position of use is almost impossible, since the holding and locking element securely reaches around or across the retainer.

Moreover, both non-positive locking and form fitting always contribute to the fixing of the position of the retainer. This helps increase the safety in the sense of a fail-safe mechanism. If one of the mechanisms of acting is disabled, such as the non-positive locking on account of destruction of the spring, the form fitting will always still be working.

Furthermore, the biasing force acting on the holding and locking element and transferred to the retainer in the position of use is especially well transferred to the retainer, because the seat which guides the holding and locking element is coordinated with the sliding body. Thus, at the same time the retainer is biased relative to the sliding body radially to the imaginary longitudinal axis of the rail, as well as the sliding body radially away from the imaginary longitudinal axis of the rail. The lower active surfaces of the fitting and the upper active surfaces of the sliding shoes serving for the fixation in the rail are pressed at the same time against the undercuts of the groove and the troughlike recesses of the groove edges, respectively, when the holding and locking element presses against the retainer.

Furthermore, the biasing force acting on the holding and locking element can support a preferred insertion of the retainer in the rail. If the retainer is being inserted in the rail in the starting position and moves a little bit radially to the imaginary longitudinal axis of the rail, the holding and locking element will still be lying against the retainer. However, now the form fitting connection between fixation device and abutment no longer exists. Yet the biasing force acting on the holding and locking element will still be transferred to the retainer. Thanks to suitable configuring of the retainer, for example, by having a bevel with suitable slope above the abutment, the biasing force acting on the holding and locking element can be transferred not only to the retainer, but also used specifically to create a movement of the retainer. It brings about a movement of the retainer radially toward the imaginary longitudinal axis of the rail, i.e., it acts in the same direction as the force of the spring, bearing against the head, acts on the retainer. Therefore, with such a configuration, there is another fail-safe mechanism in which the biasing force of the holding and locking element can replace the biasing force acting on the retainer if the latter ceases to exist.

Moreover, the fitting according to the invention is more easily reachable and activatable by the user than fittings of the prior art. The configuration of the fitting means that the risk of injury which it presents to the user is minimized. By user is meant here on the one hand the flight passengers who are taking a seat on the airplane, which is secured by means of a fitting according to the invention on an airplane body, especially on a rail let into the floor of the airplane. But on the other hand also workers engaged in the installation and removal of the fittings or the objects secured to them, especially airplane seats, are to be seen as users. For all users, the risk of injury is minimized by use of a fitting according to the invention, since on the one hand the handling is very uncomplicated and can occur without many manual manoeuvres, and on the other hand the possibility of getting caught on the fitting, for example by the skin or a garment such as a shoe, is minimized. These benefits result directly from the configuration of a fitting according to the present invention.

In a slightly modified sample embodiment one can do without the spring bearing against the head and transferring a biasing force acting radially on the imaginary longitudinal axis of the rail to the retainer.

Instead, one can contemplate a biasing force which acts on the retainer, but in the opposite direction, i.e., radially away from the rail. Thus, when not grasped by the holding and locking element, the retainer is biased to move into the starting position. This facilitates removal of the fitting from the rail, but only when the holding and locking element releases the retainer by being pushed manually, for example, away from the retainer and thus no longer grasping it. But if the holding and locking element is not held back manually by a user, it will move toward the retainer by the biasing force acting on it. Now, moreover, if the force acting on the holding and locking element is selected to be greater than the spring force acting on the retainer and moving it radially away from the imaginary longitudinal axis, a user can determine whether the retainer is in the starting position or the position of use, simply by manually moving the holding and locking element away from the retainer or not.

According to a second sample embodiment one can contemplate eliminating the seat for the holding and locking element. In this case, the holding and locking element is coordinated by means of a connection piece with the sliding body. The connection piece can be, for example, a screw or a threaded bolt, which is introduced into a threaded borehole of the sliding body and reaches through a recess of the holding and locking element, provided for this purpose, in order to coordinate it with the sliding body in a movable manner yet with the least possible free play. Also in this second sample embodiment the holding and locking element performs its function of fixing the retainer or the fitting in the starting position or the position of use by being displaced relative to the retainer. The displacement movement according to the second sample embodiment is a swivel movement, but it has the same benefits as the displacement movement of the first sample embodiment.

In the starting position, the retainer is secured by the holding and locking element by the interaction of a fixation device, such as an edge of the holding and locking element, with an abutment located on the retainer, such as a complementary trough. As a rule, a form fitting operative connection is realized in this case. In addition or alternatively, however, a non-positive operative connection can also be contemplated. For this, the holding and locking element can be biased, for example, by means of a torsional spring.

In the position of use, the retainer is secured on the other hand by the holding and locking element in that an essentially U-shaped segment of the holding and locking element reaches around or across the latter. The holding and locking element thus prevents a movement of the retainer out from the lowered position and thus acts as a locking element. Moreover, the legs of the U-shaped segment grasp the connection element so that it can be inserted or screwed a bit further into the sliding body in order to transmit by means of the head a biasing to the holding and locking element as well as the retainer underneath it. Thus, an unwanted clattering of the fitting inside the rail is reliably prevented.

It is noted here that a direction from which the holding and locking element is displaced or swivelled onto the retainer can be adapted to a direction in which the connection element is screwed in for purpose of fixing the fitting in the sliding body. In particular, a screwing in of the connection element should not have the effect of loosening the holding and locking element or releasing it from the position of use.

It should be mentioned in this place that when using a torsional spring which brings about a biasing of the holding and locking element so that it finds itself preferably reaching around or across the retainer in the position of use, the same benefits are achieved as for the first sample embodiment. In particular, one should mention here the fail-safe mechanism created by simultaneous form fitting and non-positive locking to secure the retainer in the starting position or the position of use.

Furthermore, in order to fix a fitting according to the invention with the connection element or the screw in a rail, only the shortest possible screw path is needed each time, since there is only slight space requirement between holding and locking element in the position of use.

BRIEF DESCRIPTION OF THE DRAWINGS

Further benefits, features and details will emerge from the following description of preferred sample embodiments and also by means of the drawings; these show:

FIG. 1: a perspective view of a first embodiment of a fitting according to the invention in starting position (FIG. 1*b*) and position of use (FIG. 1*a*);

FIG. 2: a top view (FIG. 2*c*), various side views (FIGS. 2*d*, 2*b*, 2*e*) and a bottom view (FIG. 2*a*) of a fitting according to FIG. 1 in the position of use;

FIG. 3: a partly sectioned side view of a fitting according to FIG. 1 in the starting position (FIG. 3*a*), the position of use (FIG. 3*c*) and an intermediate position (FIG. 3*b*);

FIG. 5: a second embodiment of a fitting according to the invention in starting position in perspective view (FIGS. 5*c*, 5*d*), side view (FIG. 5*a*) and top view (FIG. 5*b*);

DETAILED DESCRIPTION

Figure 3A:
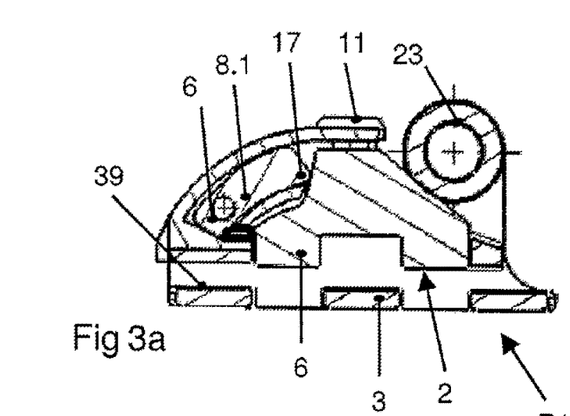
Figure 3B:
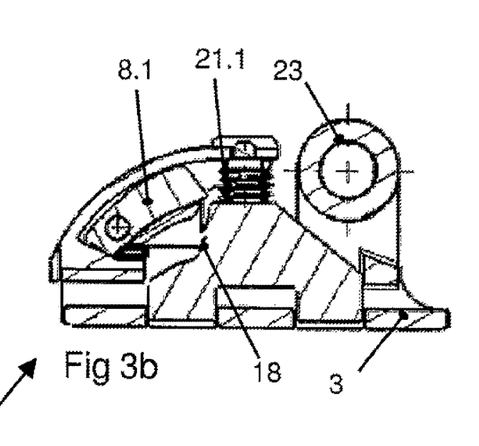
Figure 3C:
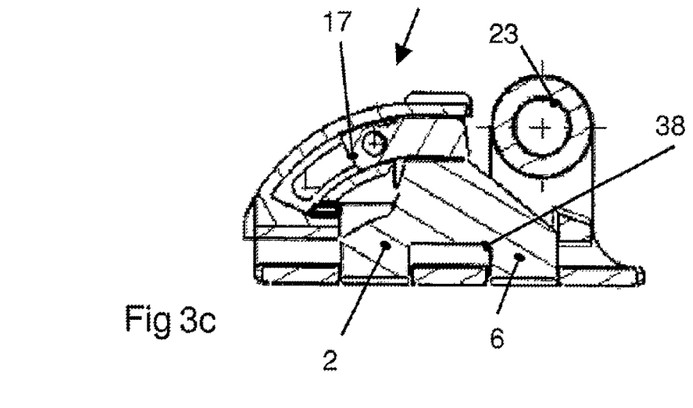
Figure 4:
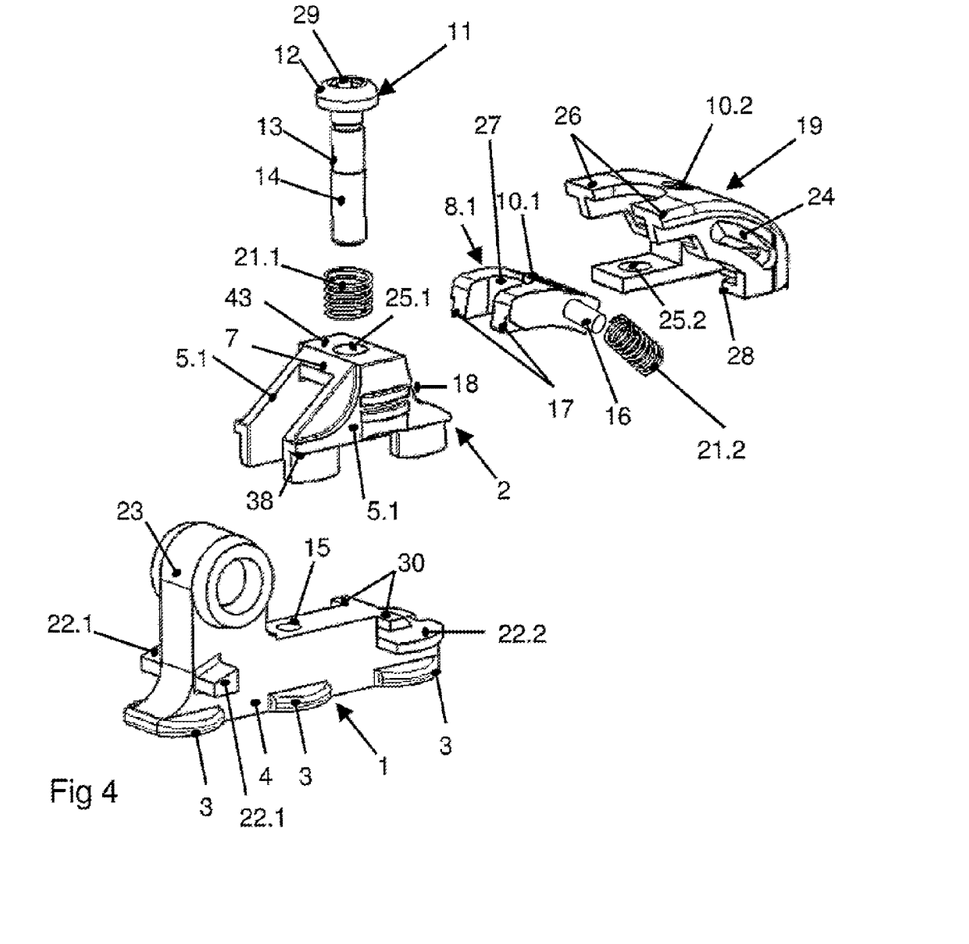
FIG. 4: an exploded representation of a fitting according to FIG. 1.
Figure 5A:
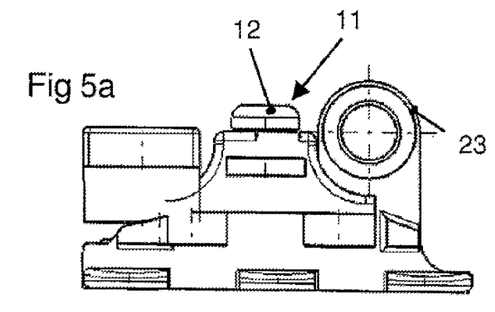
Figure 5B:
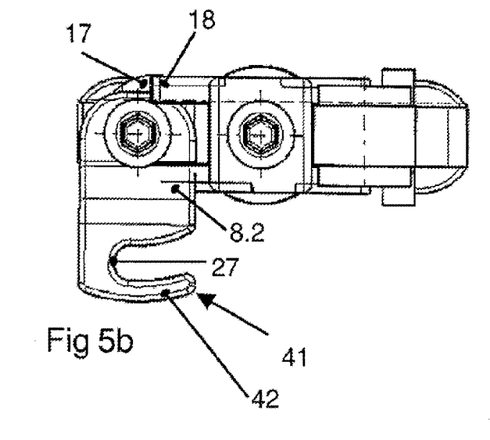
Figure 5C:
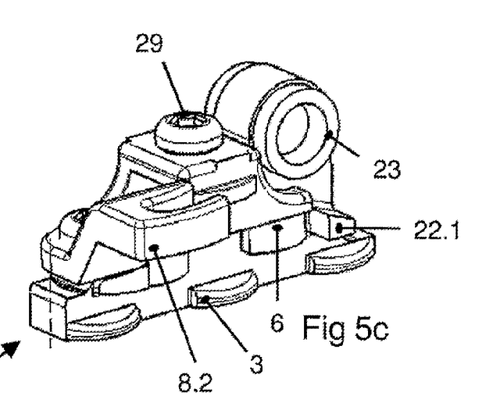
Figure 5D:
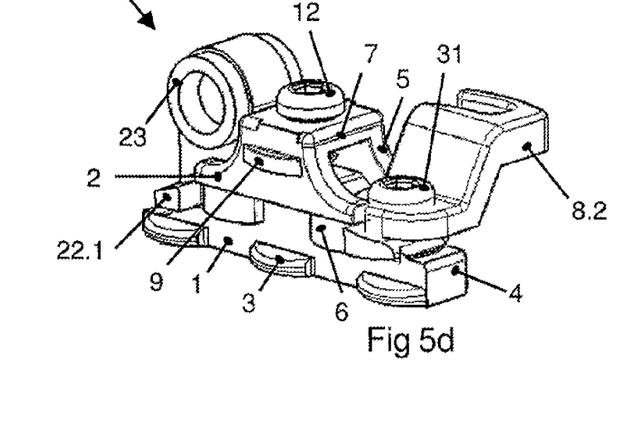
Figure 6A:
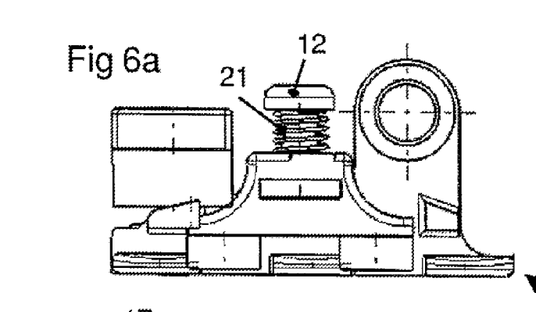
FIG. 6: the fitting according to FIG. 5 in an intermediate position in perspective view (FIGS. 5*c*, 5*d*) and side view (FIG. 5*a*) and in top view (FIG. 5*b*)
Figure 6B:
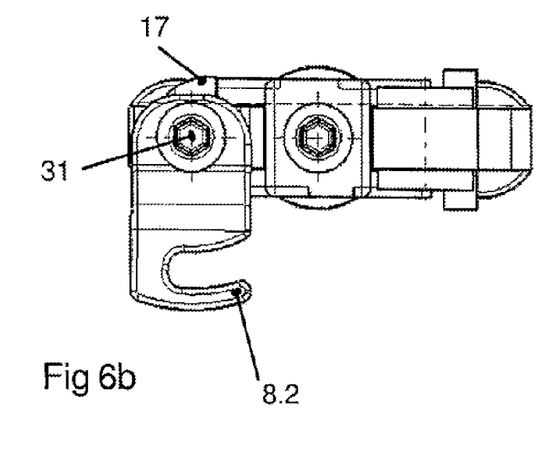
Figure 6C:
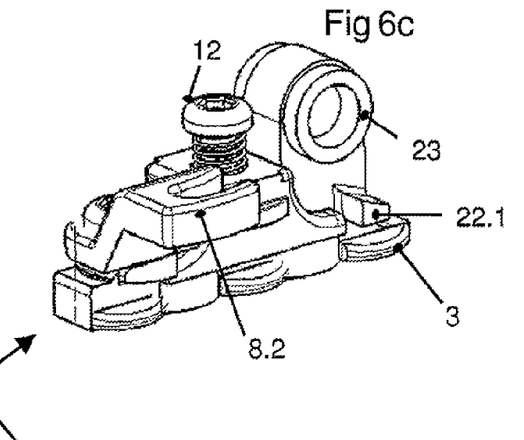
Figure 6D:
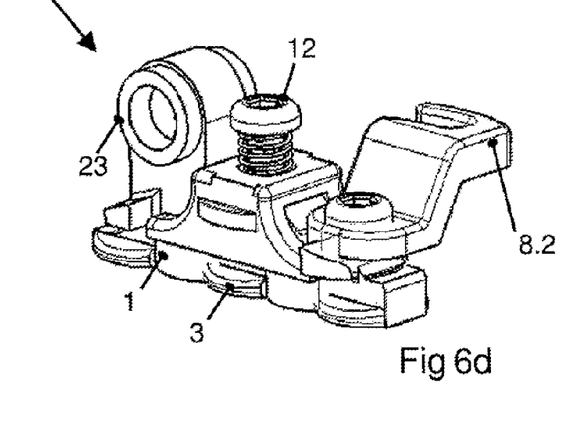

FIGS. 1 to 4 show a fitting P1 according to the invention. The fitting P1 has a sliding body 1. This embraces an inner body 4. The inner body 4 has sliding shoes 3.1, 3.2, 3.3, wings 22.1, 22.2 and a connection device 23 for connecting a seat, for example, formed on it. As is best seen in FIG. 4, the sliding body 1 furthermore has a threaded borehole 15.

Moreover, the fitting P1 has a retainer 2, which is coordinated with the sliding body 1 like a saddle. The retainer 2 consists of two side walls 5.1, 5.2, which are joined by a cross wall 7. The side walls 5.1, 5.2 have activating structures 9 formed on them. Moreover, the retainer 2 comprises thickenings 6.1, 6.2. Roughly at the middle of the retainer 2 is formed a recess 25.1 and at one end a trough 18.

Coordinated with the sliding body 1 and the retainer 2 in common are a connection element 11 as well as a helical spring 21.1.

Likewise coordinated in common to the sliding body 1 and the retainer 2 are a seat 19 and a holding and locking element 8.1 guided in the seat 19. The seat 19 has an end region in the form of two shoulders 26. At the side, the seat 19 has two oblong holes 24. The holding and locking element 8.1 has two cylindrical activating devices 16, which reach through the oblong holes 24 or are guided in them. The seat 19 moreover has a recess 25.2 as well as two grooves 28. The holding and locking element 8.1 is furthermore loaded with a spring force at one end by a helical spring 21.2. At the other end, the holding and locking element 8.1 has two edges 17 and an end stop 27.

A recess 10.2 of the seat 19 moreover forms, together with a segment 10.1 of the holding and locking element 8.1, a position indicator 10.

Figures 1A, 1B:
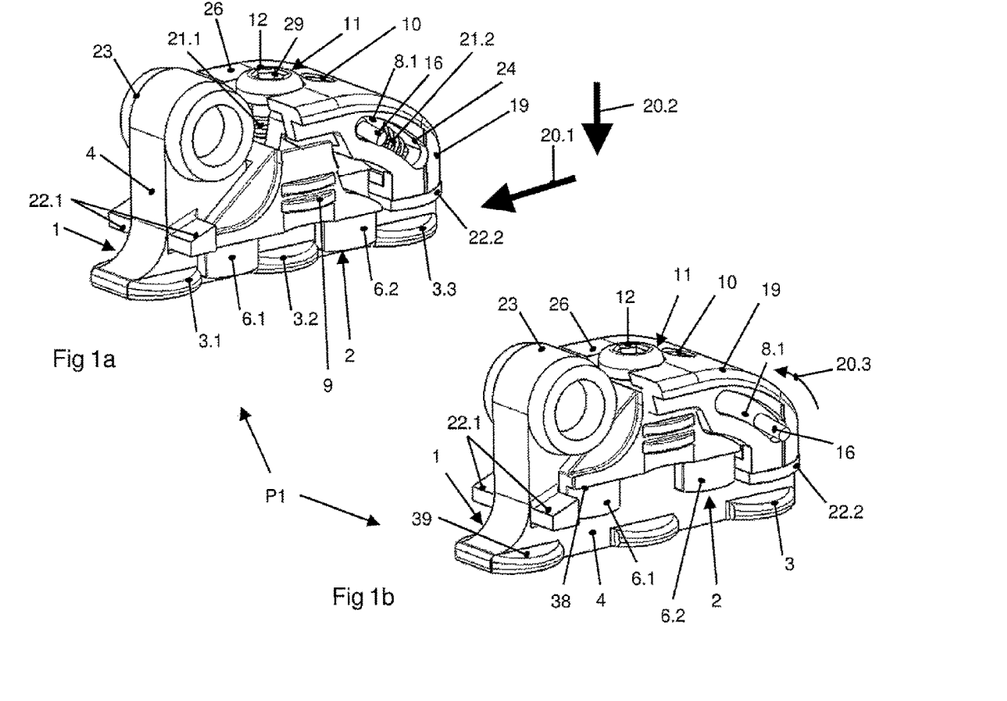
Figures 2A, 2B:
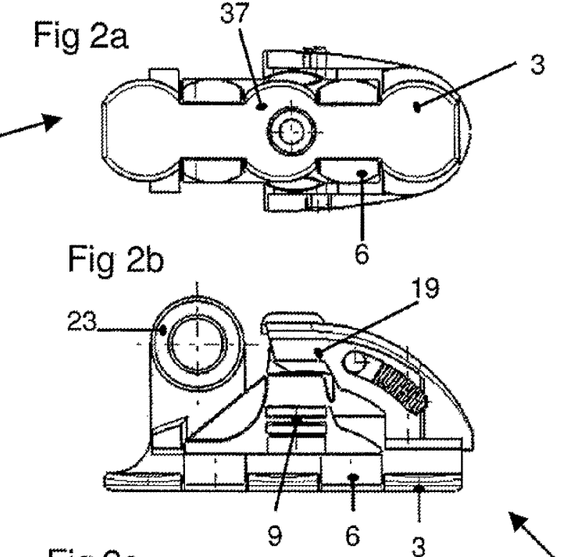
Figure 2C:
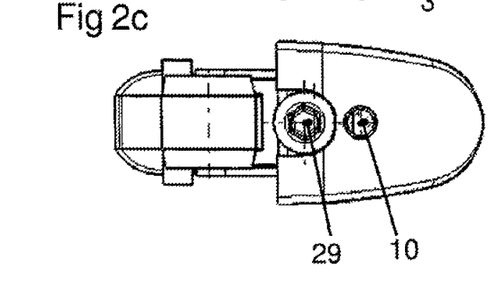
Figure 2D:
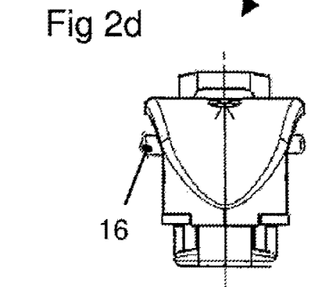
Figure 2E:
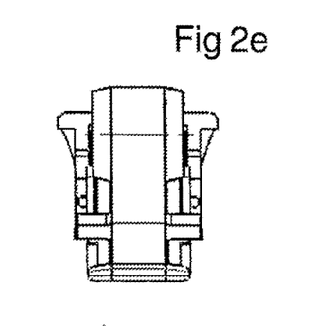

Making reference to FIGS. 1-4, the functioning of the fitting P1 shall be explained as follows:

In a starting position, as is well seen in FIGS. 1b and 3a, the fitting P1 is not inserted into the rail 36 or its opening 35 or at least it is not yet secured in the rail 36. The spring 21.1 acting in the direction of an arrow 20.2 is biased. However, the edge 17, which interacts with the trough 18 as a detent element, prevents the retainer 2 from moving in the direction of the arrow 20.2, following the force of the spring 21.1.

When in the starting position, the fitting P1 can be freely moved in and out of a rail 36. The fitting P1 is introduced into the rail 36 or its opening 35 by introducing the sliding shoes 3 of the fitting P1 through the recesses 33 of the undercut groove edges 32 into the rail 36.

The fitting P1, after being introduced into the rail 36, can be moved or displaced a bit along a direction 20.1 to a desired position within the rail 36. A displacement of the fitting P1 within the rail 36 or its opening 35 is essentially a sliding movement, in which a bottom side 37 of the fitting P1 slides on a bottom 34 of the rail 36. The sliding movement is furthermore supported by the wings 22 of the sliding body 1. Thus, the fitting P1 is securely guided in the rail and can also absorb unwanted forces which arise if necessary.

The holding and locking element 8.1 is then moved a bit contrary to the direction indicated by an arrow 20.3.

In this process, the holding and locking element 8.1 is moved contrary to the direction 20.3 so that the locking element formed from the edge 17 and the trough 18 is no longer locking. This can be done by a user, making use of activating devices 16, which are formed on the holding and locking element. The retainer 2 so released then moves in the direction of an arrow 20.2 or following a force transmitted by the helical spring 21.1 on the retainer 2 into a lowered position. This situation is indicated in FIG. 3b.

The fitting P1 is adapted to the rail 36 such that in particular the thickenings 6 of the retainer 2 secure the fitting P1 in the rail essentially free of play. Furthermore, the fitting P1 is braced via a lower active surface 38 of the retainer 2 and an upper active surface 39 of the sliding shoes 3 on both sides against the undercuts 40 of the undercut groove edges 32. Thus, the fitting P1 is reliably fixed in the position of use when the retainer 2 has taken up the lowered position.

In order to prevent an unintentional outward movement of the retainer 2 against the direction indicated by the arrow 20.2, the holding and locking element 8.1 acts as a locking element when the retainer 2 is found in the lowered position in the rail 36 or its opening 35. This can be clearly seen in FIG. 3c. Following the force of a spring 21.2, the holding and locking element 8.1 slides in the seat 19 across the end face 43 of the retainer 2, this movement essentially following the direction of an arrow 20.3. The movement of the holding and locking element 8.1 is guided on the one hand by being mounted as free of play as possible in the seat 19. On the other hand, two activating devices 16, which are led into two oblong holes 24 of the seat 19, also serve for a stable guidance of the holding and locking element 8.1.

The movement of the holding and locking element 8.1 is limited at one end by the end stop 27, which comes to lie against a shaft 13 of the connection element 11. Biased by the spring force in the arrow direction 20.3, the holding and locking element 8.1 in the position of use shown in FIG. 3c finds itself moreover in operative connection with the end face 43 of the retainer 2, by means of which it is pressed against the undercut groove 32 or the undercuts 40, braced by a lower active surface 38 against the rail 36. At the same time, a force exerted essentially in the direction of the arrow 20.2 on the retainer 2 also works back on the sliding body 1. This is pressed against the groove 32 or the undercuts 40, being braced by an upper active surface 39 of the sliding shoes 3 from an inside of the rail 36 or from its opening 35 against the undercut groove 32.

Optionally, one can now further screw the connection element 11, which has been introduced by a threaded segment 14 into a threaded borehole 15 of the sliding body 1, into the sliding body 1 in the direction of an arrow 20.1. The tool contact 29 on the head 12 of the connection element 11 is used especially for this. By the head 12 braced at least partly against the holding and locking element 8.1, the connection element 11 can exert a biasing force acting in the direction of the arrow 20.1 on the holding and locking element 8.1 and thus also on the retainer 2. By the above described operative connection between retainer 2, sliding body 1 and rail 36, the fitting P1 can thus be secured free of play and noise-free in the rail 36.

Especially advantageous for the fitting P1 according to the invention is the fact that both the force transmitted via the spring 21.1 and also the force transmitted via the holding and locking element 8.1 to the retainer 2 and the biasing force of the connection element 11 are acting equally in the screwed-in state. Furthermore, all three aforementioned forces act such that a force acting on the retainer 2 in the direction of the arrow 20.2 is always accompanied by a force acting opposite the direction 20.2. on the sliding body 1. This is easily evident, since the force-generating springs and 21.1, 21.2 and the connection element 11 are each mounted directly or indirectly both on or at the sliding body 1 and on or at the retainer 2.

The position indicator 10 moreover constantly tells the user in which position the holding and locking element 8.1 and thus the entire fitting P1 finds itself.

Moreover, the fitting P1 can be easily removed and taken apart, for example in order to replace the spring 21.2 or the holding and locking element 8.1. For this, the connection element 11 is unscrewed from the sliding body 1 by means of a tool fitting the tool contact 29. Thus, the seat 19 is no longer joined by the recess 25.2 to the sliding body 1. The seat 19 can now be easily removed by pulling it off from a bearing element 30 of the sliding body 1 essentially opposite the direction of an arrow 20.1.

Figure 7A:
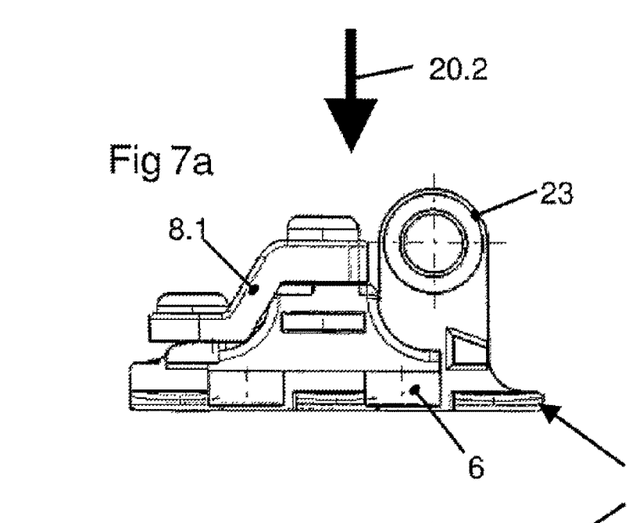
FIG. 7: the fitting according to FIG. 5 in a position of use in perspective view (FIG. 5*c*), side view (FIG. 5*a*) and top view (FIG. 5*b*)
Figure 7B:
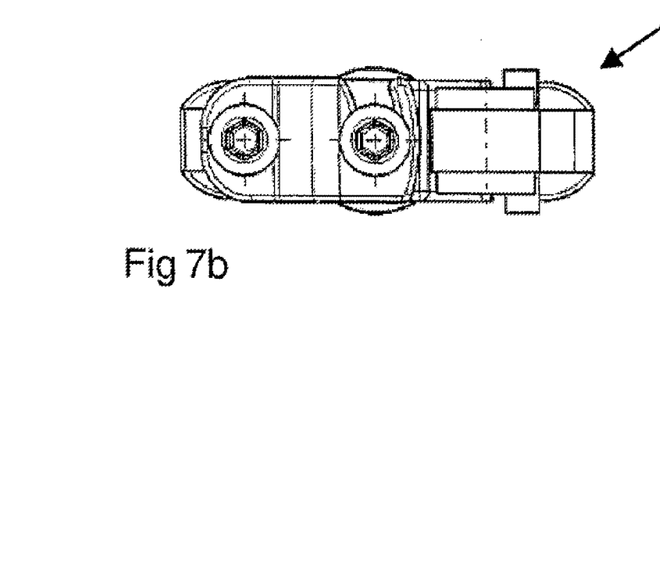
Figure 7C:
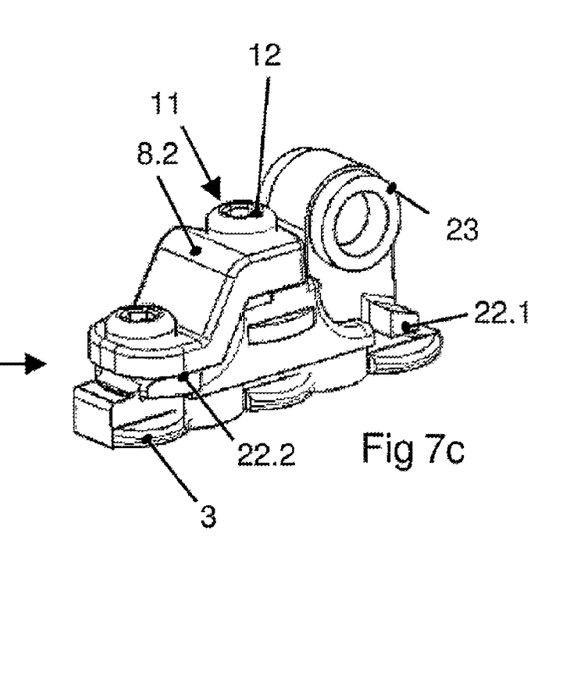
Figure 8:
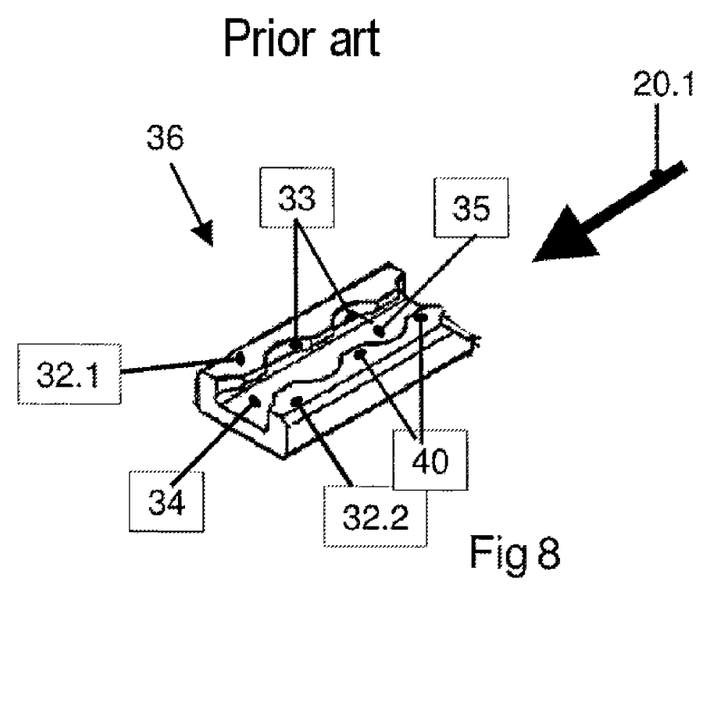
FIG. 8: a typical airline rail.

FIGS. 5 to 7 show a fitting P2 according to the invention. The fitting P2 differs from the fitting P1 primarily in the configuration of the holding and locking element 8.2, while the seat 19 has been eliminated. Instead, the holding and locking element 8.2 is coordinated with a connection piece 31. Moreover, it has an edge 17 and an end stop 27.

An activating structure 9 moreover serves for a manual movement of the retainer 2. This may be necessary, for example, if a fitting P1 gets jammed in the rail 36 during operation in an airplane or the like on account of dirt and grime on the airplane floor. A manual movement of the retainer via the activating structure 9 can, if desired, also replace the spring 21.1 if one specifically wants to do without a biasing of the retainer 2.

Referring to FIGS. 5-7, the functioning of the fitting P2 shall be explained as follows:

The connection piece 31 determines a possible displacement or swivelling movement of the holding and locking element 8.2. The fitting P2 is held in the starting position in that the holding and locking element 8.2 fixes the retainer 2 by means of an edge 17, which enters into operative connection with the trough 18 of the retainer 2. This situation is shown in FIG. 5.

But if the retainer 2 finds itself in the lowered position into the rail 36 or the opening 35 of the rail 36, there is no longer any operative connection between holding and locking element 8.2 and retainer 2 or between trough 18 and edge 17. This configuration, in which the operative connection between trough 18 and edge 17 no longer exists, is shown in FIG. 6. The holding and locking element 8.2 can now be swivelled relative to the retainer 2 in order to fix it in the lowered position. A swivel axis coordinated with this movement or this swivelling is provided by the connection piece 31. The lowered position of the retainer 2, in which the holding and locking element at the same time reaches around or across the retainer 2, corresponds to the position of use of the fitting P2 and is shown in FIG. 7. A U-shaped segment 41 of the retainer 2 reaches across the end face 43 of the retainer 2 to act as a locking element and prevent a movement of the retainer 2 out from the position of use in which the retainer 2 finds itself in a lowered position. The connection element 11 is situated here between two legs 42 of the U-shaped segment 41 and is thus grasped by the latter. The connection element 11 can now be screwed tight in order to fix the retainer 2 and thus the overall fitting, that is, inserted or screwed a bit further along a direction 20.2 into the sliding body 1, in order to bias the locking element 8.2 by means of the head 12 relative to the retainer 2, which at the same time is biased relative to the sliding body 1.

The invention claimed is:

1. A fitting (P1, P2) for fixing an object on a rail, comprising a sliding body (1) and a retainer (2), the retainer is movably coordinated with the sliding body (1), the retainer (2) is placed in a lowered and a raised position relative to the rail, and a holding and locking element (8.1, 8.2) is provided, wherein the holding and locking element (8.1, 8.2) is arranged to be movable relative to the retainer (2), wherein a connection element (11) is provided to movably connect the sliding body (1) and the retainer (2), and wherein the connection element (11) has a threaded segment (14), which engages with a threaded borehole (15) of the sliding body (1), and wherein the connection element (11) furthermore comprises a head (12) having a recess (29) for engaging with a tool, and further comprising a first force storing element (21.1) for pushing the retainer (2) toward the lowered position, interlocking structures (17, 18) on the holding and locking element (8.1, 8.2) and the retainer (2) for engaging with each other in an engaged position to fix the retainer (2) in the raised position, and a second force storing element (21.2) for pushing the holding and locking element (8.1, 8.2) toward the engaged position.

2. The fitting (P1, P2) as claimed in claim 1, wherein the holding and locking element (8.1, 8.2) fixes the retainer (2) in both the raised and the lowered position.

3. The fitting (P1, P2) as claimed in claim 2, wherein the holding and locking element (8.1, 8.2) is force-loaded.

4. The fitting (P1, P2) as claimed in claim 2, wherein the interlocking structures comprise a fixation device (18) molded onto the retainer (2), and an abutment (17) molded onto the holding and locking element (8.1, 8.2), wherein the fixation device (18) and the abutment (17) interact as a detent element for holding the retainer (2) in the raised position.

5. The fitting (P1, P2) as claimed in claim 2, wherein the holding and locking element (8.1, 8.2) are located in a position to serve as a locking element and to fix the retainer (2) in the lowered position.

6. The fitting (P1, P2) as claimed in claim 5, wherein the holding and locking element (8.1, 8.2) extends across the retainer (2).

7. The fitting (P1, P2) as claimed in claim 5, wherein the holding and locking element (8.1, 8.2) transmits to the retainer (2) a force acting essentially orthogonally to a longitudinal axis (20.1) of the rail and in the direction (20.2) of this longitudinal axis (20.1), wherein the holding and locking element (8) bears against an end surface of the retainer (2) which faces away from the rail.

8. The fitting (P1, P2) as claimed in claim 1, wherein the sliding body (1) is coordinated with a seat (19) for guiding the holding and locking element (8.1).

9. The fitting (P1, P2) as claimed in claim 1, wherein an activating device (16) is provided on the holding and locking element (8.1, 8.2).

10. The fitting (P1) as claimed in claim 9, wherein the activating device is a boltlike cross bar (16), which fits into oblong holes (24).

11. A method for fixing a position of a retainer (2) of the fitting (P1, P2) according to claim 1, for fixing an object on a rail, wherein the method includes moving the holding and locking element relative to the retainer (2).

12. A method as claimed in claim 11, including providing the interlocking structures (17, 18) by molding a fixation device (18) onto the holding and locking element (8.1, 8.2) in an operative connection with an abutment (17) of the retainer (2) for fixing the retainer (2) in a raised position.

13. The method as claimed in claim 11, wherein the holding and locking element (8.1, 8.2) extends across the retainer (2) for fixing the retainer (2) in the lowered position.

14. The method as claimed in claim 13, including moving a connection element (11) having a head in a radial direction toward the retainer (2), wherein the head (12) comes to lie at least partly on the retainer (2).

* * * * *